United States Patent
Smadja

(10) Patent No.: US 8,860,272 B2
(45) Date of Patent: Oct. 14, 2014

(54) SYNCHRONOUS GENERATOR, ESPECIALLY FOR WIND TURBINES

(75) Inventor: Charles Smadja, Toulouse (FR)

(73) Assignee: Alstom Hydro France, Levallois Perret (FR)

( * ) Notice: Subject to any disclaimer, the term of this patent is extended or adjusted under 35 U.S.C. 154(b) by 30 days.

(21) Appl. No.: 13/095,358

(22) Filed: Apr. 27, 2011

(65) Prior Publication Data
US 2011/0266811 A1 Nov. 3, 2011

Related U.S. Application Data

(60) Provisional application No. 61/330,033, filed on Apr. 30, 2010.

(51) Int. Cl.
*H02K 1/27* (2006.01)
*H02K 1/30* (2006.01)
*H02K 7/18* (2006.01)

(52) U.S. Cl.
CPC ............ *H02K 1/278* (2013.01); *H02K 2213/12* (2013.01); *Y02E 10/725* (2013.01); *H02K 1/30* (2013.01); *F05B 2220/70642* (2013.01); *H02K 7/1838* (2013.01)
USPC .................................. 310/156.38; 310/156.45

(58) Field of Classification Search
USPC ............. 310/156.08, 156.12, 156.15, 156.22, 310/156.38, 156.41–156.45, 310/156.66–156.71, 156.19, 156.21, 310/156.48, 156.54, 156.59
See application file for complete search history.

(56) References Cited

U.S. PATENT DOCUMENTS

| 3,072,813 | A | * | 1/1963 | Van Donselaar et al. ................ 310/156.55 |
| 3,671,788 | A | * | 6/1972 | Knudson et al. ......... 310/156.55 |
| 3,828,212 | A | * | 8/1974 | Harkness et al. ............. 310/153 |
| 4,425,521 | A | * | 1/1984 | Rosenberry, Jr. et al. .... 310/214 |
| 5,111,094 | A | * | 5/1992 | Patel et al. ................ 310/156.22 |
| 5,117,553 | A | * | 6/1992 | Kliman .......................... 29/598 |
| 6,013,963 | A | * | 1/2000 | Shelton, Jr. ................... 310/179 |
| 6,160,336 | A | * | 12/2000 | Baker et al. ...................... 310/74 |
| 6,335,582 | B1 | * | 1/2002 | Abukawa et al. ............. 310/214 |
| 6,879,075 | B2 | | 4/2005 | Calfo et al. |
| 7,701,100 | B2 | * | 4/2010 | Morel ...................... 310/156.19 |

FOREIGN PATENT DOCUMENTS

| DE | 102007038668 A1 | 2/2009 |
| EP | 2028744 A1 | 2/2009 |
| GB | 2062977 A | 5/1981 |

* cited by examiner

*Primary Examiner* — Dang Le
(74) *Attorney, Agent, or Firm* — Buchanana Ingersoll & Rooney PC

(57) ABSTRACT

A synchronous generator is provided. The generator includes a rotor, which rotates around a machine axis and is concentrically surrounded by a stator with a stator winding. A plurality of permanent magnets and pole pieces are alternatingly arranged at the rim of the rotor with the permanent magnets being oriented in an essentially tangential direction. Torque and power characteristic of the generator are improved by alternating pole pieces and pairs of permanent magnets. The permanent magnets each have a rectangular cross section in the axial direction, the pole pieces each have a symmetric trapezoidal cross section in the axial direction with the symmetry plane of the trapezoid extending radially through the machine axis and the longer parallel side lying outside. The two permanent magnets of each pair of permanent magnets are separated from each other by an intermediate wedge, which corresponds with its cross section to the trapezoidal pole pieces.

14 Claims, 4 Drawing Sheets

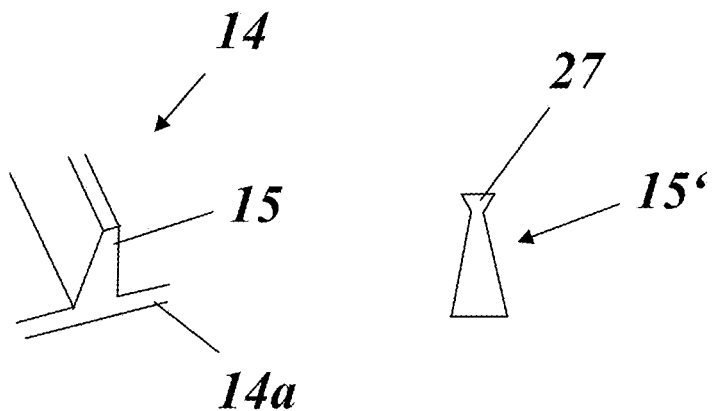
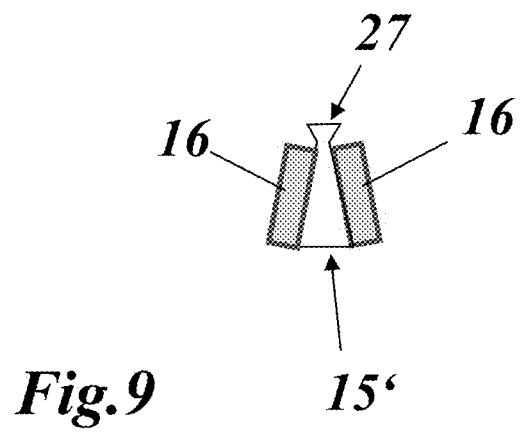
Fig.7　　　　　　Fig.8
Fig.9

SYNCHRONOUS GENERATOR, ESPECIALLY FOR WIND TURBINES

CROSS REFERENCE TO RELATED APPLICATION

This application claims the benefit of U.S. Provisional Application No. 61/330,033, filed Apr. 30, 2010, the entire contents of which is incorporated by reference as if fully set forth.

FIELD OF INVENTION

The present invention relates to rotating electric machines. In particular, it refers to a synchronous generator.

BACKGROUND

Permanent magnet generators are typically characterized by the following advantages: simple construction, high efficiency, high power factor, and high power density. These types of generators are therefore well suited for direct-drive wind turbine applications.

As the output power of wind turbines has rapidly increased, the development of advanced generators has inherently involved the design and construction of large diameter and low speed machines. Over the past several years, high efficiency and lightweight generators using advanced magnetic materials have been developed.

There are several types of rotor topologies for permanent magnet (PM) synchronous generators. The configurations of the rotors can be divided into radial and transversal forms depending on the orientation of the magnetization direction of the permanent magnets (see for example FIGS. 1A and 1B of U.S. Pat. No. 6,879,075).

The transversal (or circumferential or tangential) configuration is more suitable for applications requiring high power density and performance. The transversal-oriented magnet configuration is characterized by a partially non-magnetic rotor core with alternating transversal-oriented permanent magnets and iron rotor pole pieces. The rotor pole pieces perform flux concentration, which improves the utilization of copper and iron of the stator. The stator may be the same as in a conventional radial oriented magnet generator design, but with reduced dimensions and weight, and lower losses.

One disadvantage of transversal-oriented magnet configurations as compared to radial-oriented magnet configurations is that the leakage flux may be comparatively larger. The leakage flux is the magnetic flux that does not cross the air gap, and that is lost in the rotor and therefore providing no useful magnetic field. The conventional transversal permanent magnet configuration thus leads to a poor utilization of magnets due to flux leakage through the rotor body.

A way to reduce these leakages is to use an intermediate ring made from non magnetic material, as described in document EP 2 028 744.

Another way to maximize the magnet utilization is to use trapezoidal magnets, as described in the aforementioned document U.S. Pat. No. 6,879,075 (see FIGS. 5 and 6).

SUMMARY

The present disclosure is directed to a synchronous generator including a rotor, which rotates around a machine axis and is concentrically surrounded by a stator with a stator winding. A plurality of permanent magnets and pole pieces are alternatingly arranged at a rim of the rotor with the permanent magnets being oriented in an essentially tangential direction. The pole pieces and pairs of permanent magnets alternate, the permanent magnets each have a rectangular cross section in an axial direction, the pole pieces each have a symmetric trapezoidal cross section in the axial direction with a symmetry plane of the trapezoid extending radially from the machine axis with the longer parallel side lying outside. The two permanent magnets of each pair of permanent magnets are separated from each other by an intermediate wedge, which has a cross section that corresponds to the trapezoidal pole pieces.

BRIEF DESCRIPTION OF THE DRAWINGS

The present invention is now to be explained in more detail by means of different embodiments and with reference to the attached drawings.

FIG. 7 shows an intermediate wedge with a simple cross-sectional profile;

FIG. 8 shows an intermediate wedge with an improved cross-sectional profile having an additional locking capability; and FIG. 9 shows the arrangement of the permanent magnets on both sides of the intermediate wedge of FIG. 8.

DETAILED DESCRIPTION OF THE PREFERRED EMBODIMENTS

Introduction to the Embodiments

Figure 1:
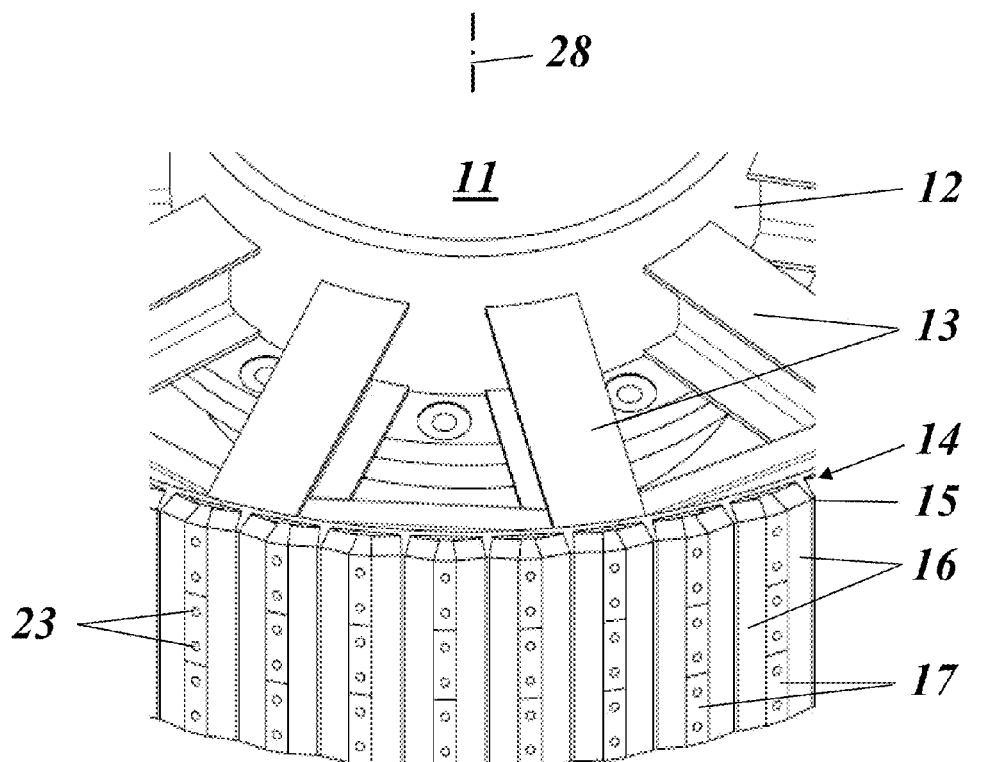
FIG. 1 shows in a perspective side view part of a rotor of a synchronous machine according to a preferred embodiment of the invention.

It is an object of the present invention to design a synchronous generator with improved torque and power characteristics.

This synchronous generator, which is suitable for wind turbines, comprises a rotor, which rotates around a machine axis and is concentrically surrounded by a stator with a stator winding, whereby a plurality of permanent magnets and pole pieces is alternating arranged at the rim of the rotor with the permanent magnets being oriented in an essentially tangential direction. It is characterized in that pole pieces and pairs of permanent magnets alternate, the permanent magnets each have a rectangular cross section in the axial direction, the pole pieces each have a symmetric trapezoidal cross section in the axial direction with the symmetry plane of the trapezoid going through the machine axis and the larger of the parallel sides lying outside, and the two permanent magnets of each pair of permanent magnets are separated from each other by means of an intermediate wedge, which corresponds with its cross section to the trapezoidal pole pieces.

This invention refers to both minimizing rotor flux leakages and maximizing magnet efficiency. In this invention, one trapezoidal magnet is replaced by two smaller rectangular magnets. These two magnets are localized on both sides of a mostly triangular wedge made of magnetic steel. This intermediate wedge can lie directly on the rotor wheel even though the rotor wheel is made of magnetic steel, because no flux leakage can occur at this position. The intermediate wedge can be directly manufactured as part of the rotor wheel, or can be assembled on the rotor by welding or by mechanical fixation.

The leakage flux in the rotor is thus minimized, together with an improved manufacturability for the magnets and a better air-cooling possibility. A transversal permanent magnet configuration with alternating permanent magnets and magnetic pole pieces is used. The permanent magnets are done with assembling two rectangular permanent magnets and a magnetic iron wedge in between. The set of two rectangular magnets and intermediate wedge is then inserted between trapezoidal shaped flux concentration pole pieces. The intermediate metallic piece can either be integrated in the rotor or be manufactured as a separate part. The rotor ring can be manufactured in several parts thanks to this design.

This arrangement with two rectangular permanent magnets and an in-between metallic triangular wedge leads to an optimal shape to maximize the electromagnetic flux (and therefore the use of permanent magnets) and to minimize the losses in the rotor. The leakage flux in the rotor is minimized because the shortest way for the magnetic flux (in case of leakage) is increased compared to other configurations.

In addition, the magnetization of the rectangular permanent magnets is more efficient and easier than the magnetization of a trapezoidal magnet.

According to an embodiment of the invention the intermediate wedges are made of magnetic iron.

According to another embodiment of the invention the permanent magnets are mounted on a cylindrical magnet support, and the intermediate wedges each are an integral part of the magnet support.

According to another embodiment of the invention the cylindrical magnet support is put together from a plurality of cylinder segments.

According to another embodiment of the invention the pole pieces with their adjoining permanent magnets are each separated from the magnet support by means of an intermediate non-magnetic strip.

According to another embodiment of the invention the intermediate non-magnetic strips are made of a reinforced epoxy material.

According to another embodiment of the invention the pole pieces are removable mounted on the magnet support especially by means of non-magnetic screws and bolts.

According to another embodiment of the invention the intermediate wedges are provided at their tip with an axially extending locking rail, which locks the adjoining permanent magnets to the magnet support even if they are demagnetized.

According to just another embodiment of the invention the outer diameter of the rotor is reduced between neighbouring pole pieces, thereby creating an axially extending cooling channel for the flow of a cooling gas, especially air.

DETAILED DESCRIPTION

Figure 2:
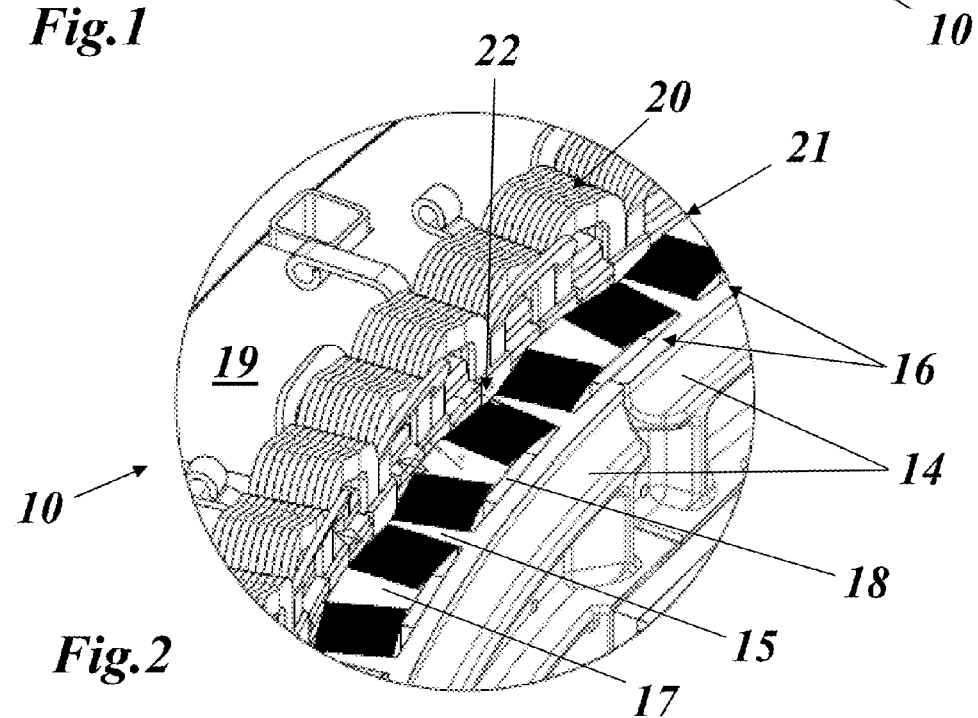
FIG. 2 shows in a perspective view part of the arrangement of rotor and stator of the machine according to FIG. 1.

FIG. 1 shows in a perspective side view part of a rotor of a synchronous machine according to a preferred embodiment of the invention. The synchronous machine 10 of FIG. 1 comprises a rotor 11, which rotates around a machine axis 28. As is shown in FIG. 2, the rotor 11 is concentrically surrounded by a stator 19, which is equipped with a stator winding 20. A plurality of permanent magnets 16 and pole pieces 17 is arranged in a special alternate arrangement at the rim of the rotor 11.

Figure 3:
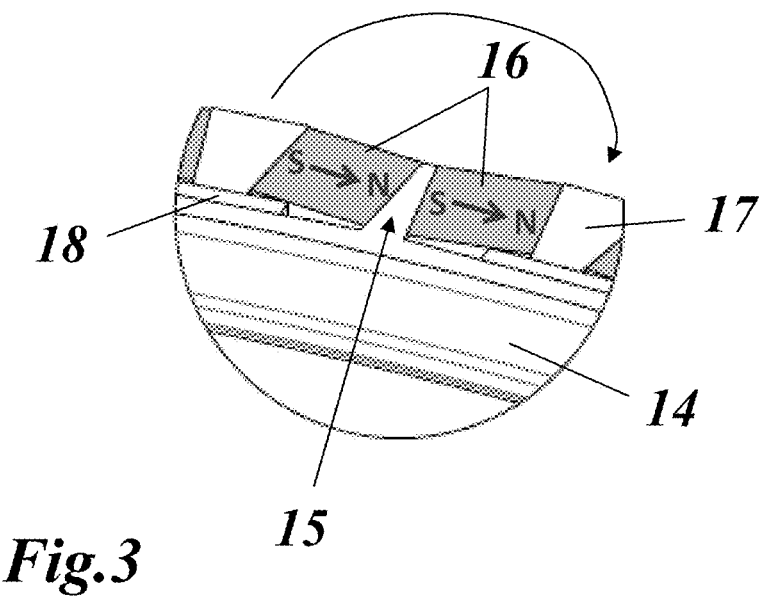
FIG. 3 shows the magnetic orientation of the permanent magnets on both sides of intermediate wedge in the machine according to FIG. 1 or 2.

The permanent magnets 16 are oriented with their magnetization direction in an essentially tangential direction (see FIG. 3). The permanent magnets 16 extend in the axial direction and have each a rectangular cross section in the axial direction. The pole pieces 17 and pairs of two permanent magnets 16 alternate. The pole pieces 17, which may be sub-divided in the axial direction, each have a symmetric trapezoidal cross section in the axial direction with the symmetry plane of the trapezoid going through the machine axis 28. The larger one of the two parallel sides of the trapezoid lies outside.

The two permanent magnets 16 of each pair of permanent magnets are separated from each other by means of an intermediate wedge 15 (see FIG. 3), which corresponds with its cross section to the trapezoidal pole pieces 17. Due to this configuration of the pairs of permanent magnets 16 and pole pieces 17, the electromagnetic flux between the pole pieces 17 has the curved characteristic indicated by the curved arrow in FIG. 3.

This arrangement with two rectangular permanent magnets 16 and an in-between metallic triangular wedge 15 leads to an optimal shape to maximize the electromagnetic flux (and therefore the use of permanent magnets) and to minimize the losses in the rotor 11. The leakage flux in the rotor 11 is minimized because the shortest way for the magnetic flux (in case of leakage) is increased compared to other configurations. In addition, the magnetization of the rectangular permanent magnets 16 is more efficient and easier than the magnetization of a trapezoidal magnet.

Thus, while in a conventional rotor design with transversal permanent magnets, a magnetic steel pole piece is used between two permanent magnets of opposed polarity as a magnetic flux concentrator, according to the invention, a magnetic steel pole piece is used as well between pairs of permanent magnets of the same polarity (see FIG. 3). The magnetic steel flux concentration pole pieces 17 have a trapezoidal shape.

Figure 5:
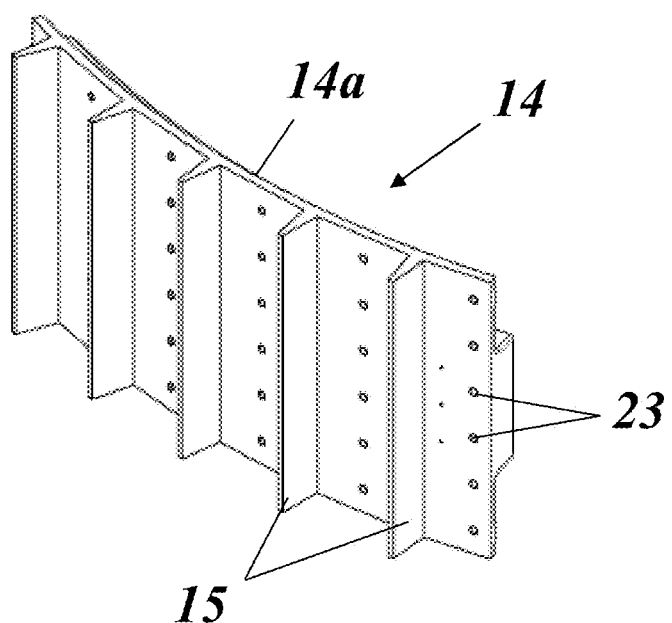
FIG. 5 shows in a perspective view from outside a cylinder segment of the magnet support of a machine according to FIG. 1 or 2.
Figure 6:
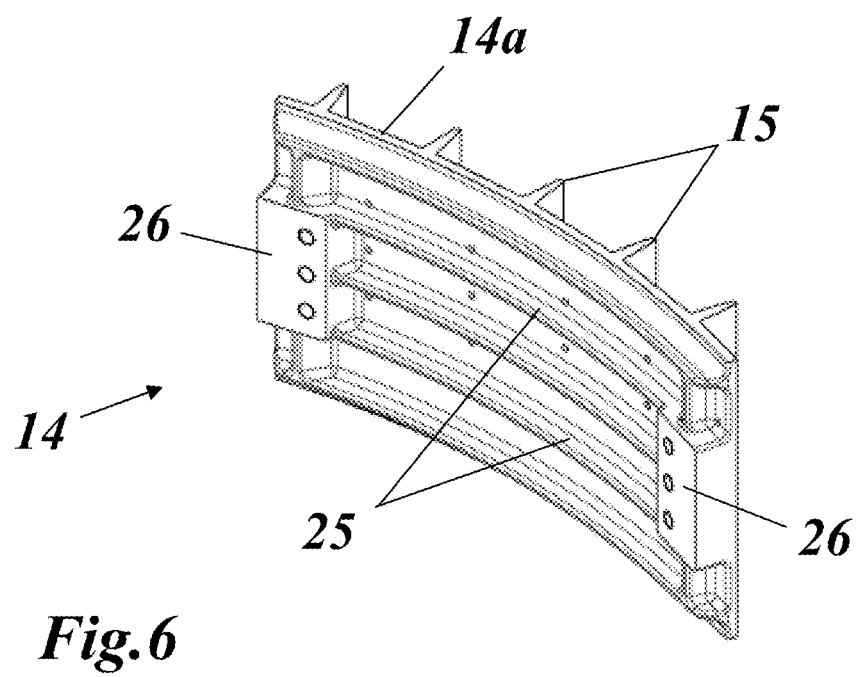
FIG. 6 shows the same cylinder segment in a perspective view from the inside.

As can be seen in FIG. 2, the permanent magnets 16 are mounted within the rotor 11 on a cylindrical magnet support 14. The magnet support 14 is connected to the rotor core 12 (FIG. 1) by means of a plurality of radial spokes 13. The magnet support 14 may be put together from a plurality of cylinder segments or sectors 14a, which are shown in FIGS. 5 and 6. This configuration allows manufacturing the rotor 11 by sectors. Each segment could be manufactured for example as a modular iron casting or as a steel welded item. The segments 14a may be reinforced by a plurality of circumferential ribs 25 on the inner side. Each segment is provided with two connection faces 26 for being connected to the spokes 13 of the rotor 11. This rotor modular construction is quite useful for a multi-megawatt direct drive generator application.

The intermediate wedges 15, which magnetically connect both permanent magnets 16 of each pair of permanent magnets, are extending in radial direction from the outer side of the magnet support 14 or cylinder segments 14a. Advantageously, they are—as shown in FIG. 5 or 6—an integral part of the magnet support 14 or cylindrical segment 14a.

The flux leakage in the rotor 11 below the flux concentration pole pieces 17 is reduced by the use of a non-magnetic strip or wedge 18 underneath (see FIGS. 2 and 3). These non-magnetic strips or wedges 18 are necessary for the mechanical fixation of the magnets and steel pieces on the rotor body. They can be made for example out of fiber glass composite materials and epoxy resin. An intermediate non-magnetic ring is no longer required. Only the flux concentration pole pieces 17 need to be magnetically insulated from the rotor.

One construction issue with transversal permanent magnet rotor configurations is often the fixation of the magnets. As a non-magnetic ring was required between the metallic rotor and the magnets in prior-art solutions, the electromagnetic force of the magnets could be used for fixation, and therefore an exact assembly process was required to ensure an accurate enough positioning of the magnets.

This invention allows fixing the permanent magnets 16 directly on the metallic intermediate wedges or triangles 15 through the electromagnetic forces. The accuracy of magnet positioning results from proper alignment of the intermediate wedge 15. The intermediate wedge 15 attracts the magnets on both sides and therefore they are self-supported. Finally, the flux concentration pole pieces 17 are inserted while the accurate positioning is already achieved.

Figure 4:
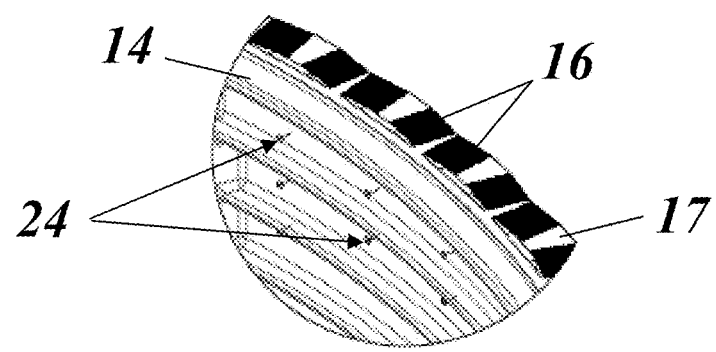
FIG. 4 shows part of the magnet support of the machine according to FIG. 1 or 2 with the means for fixing the pole pieces.

The pole pieces 17 are fixed on the rotor 11 using a non-magnetic screw, which is put into a respective bore (23 in FIG. 5) and a non-magnetic bolt (24 in FIG. 4), which sits on the inner face of the magnet support 14. The non-magnetic strip 18 between the pole piece 17 and the magnet support 14 of the rotor 11 is fixed as well with these screws and bolts. Some glue may be used between the support 14 and the non-magnetic strip 18 to secure the mechanical assembly. In addition, the fixation of the pole pieces 17 is used as a secondary fixation and locking device for the permanent magnets 16. This mechanical fixation of the magnets brings safety in case of demagnetization.

As shown in FIGS. 8 and 9, the intermediate wedges 15' may be provided at their tips with an axially extending locking rail 27, which locks the adjoining permanent magnets 16 to the magnet support even if they are demagnetized. Thus, the locking rail 27 helps to: (1) facilitate permanent magnet assembly, and (2) participate in the fixation of the permanent magnets 16 on the rotor 11, whereby, in particular, the rails 27 will lock the magnets on the rotor, when the magnets are demagnetized.

Finally, the shape of the permanent magnet assembly of the pole piece, where the outer diameter of the rotor 11 is reduced between neighbouring pole pieces 17, leads to a minimal air gap between the rotor and the stator (as in a conventional design), but provides in addition a larger gap or volume between the permanent magnets 16 and the stator 19. This additional volume provides an additional cross section or cooling channel 22 for the air flowing axially in the air-gap to feed the stator radial vents. Therefore stator ventilation, as well as air cooling of the permanent magnets 16, is improved.

LIST OF REFERENCE NUMERALS 10 synchronous generator
11 rotor
12 rotor core
13 spoke
14 magnet support (rotor ring)
14a cylinder segment
15,15' intermediate wedge (metallic)
16 permanent magnet
17 pole piece
18 non-magnetic strip
19 stator
20 stator winding
21 air gap
22 cooling channel
23 bore
24 bolt (non-magnetic)
25 rib
26 connection face
27 locking rail
28 axis

What is claimed is:

1. Synchronous generator, comprising a rotor, which rotates around a machine axis and is concentrically surrounded by a stator with a stator winding, whereby a plurality of permanent magnets and pole pieces are alternatingly arranged at a rim of the rotor with the permanent magnets being oriented in an essentially tangential direction, the pole pieces and pairs of permanent magnets alternate, the permanent magnets each have a rectangular cross section in an axial direction, the pole pieces each have a symmetric trapezoidal cross section in the axial direction with a symmetry plane of the trapezoid extending radially through the machine axis and the longer parallel side lying outside, and the two permanent magnets of each pair of permanent magnets are separated from each other by an intermediate wedge on the rotor rim, which has a triangular cross section in a radial direction.

2. The synchronous generator according to claim 1, wherein the intermediate wedges are made of a magnetic iron.

3. The synchronous generator according to claim 1, wherein the permanent magnets are mounted on a cylindrical magnet support, and the intermediate wedges each are an integral part of the magnet support.

4. The synchronous generator according to claim 3, wherein the cylindrical magnet support is put together from a plurality of cylinder segments.

5. The synchronous generator according to claim 3, wherein the pole pieces with their adjoining permanent magnets are each separated from the magnet support by an intermediate non-magnetic strip.

6. The synchronous generator according to claim 5, wherein the intermediate non-magnetic strips are made of a reinforced epoxy material.

7. The synchronous generator according to claim 3, wherein the pole pieces are removable mounted on the magnet support by non-magnetic screws and bolts.

8. The synchronous generator according to claim 1, wherein the intermediate wedges are provided at tips thereof with an axially extending locking rail, which locks the adjoining permanent magnets to the magnet support even if they are demagnetized.

9. The synchronous generator according to claim 1, wherein an outer diameter of the rotor is reduced between neighboring pole pieces, thereby creating an axially extending cooling channel for the flow of a cooling gas.

10. The synchronous generator according to claim 9, wherein the cooling gas is air.

11. A wind turbine comprising the synchronous generator of claim 1.

12. Synchronous generator, comprising a rotor, which rotates around a machine axis and is concentrically surrounded by a stator with a stator winding, whereby a plurality of permanent magnets and pole pieces are alternatingly arranged at a rim of the rotor with the permanent magnets being oriented in an essentially tangential direction, the pole pieces and pairs of permanent magnets alternate, the permanent magnets each have a rectangular cross section in an axial direction, the pole pieces each have a trapezoidal cross section in a radial direction with a symmetry plane of the trapezoid extending radially through the machine axis and the longer parallel side lying outside, and the two permanent magnets of each pair of permanent magnets are separated from each other by an intermediate wedge on the rotor rim.

13. Synchronous generator, comprising a rotor, which rotates around a machine axis and is concentrically surrounded by a stator with a stator winding, whereby a plurality of permanent magnets and pole pieces are alternatingly arranged at a rim of the rotor with the permanent magnets being oriented in an essentially tangential direction, the pole pieces and pairs of permanent magnets alternate, the permanent magnets each have a rectangular cross section in an axial direction, the pole pieces each have a trapezoidal cross section in a radial direction with a symmetry plane of the trapezoid extending radially through the machine axis and the longer parallel side lying outside, and the two permanent magnets of each pair of permanent magnets are separated from each other by an intermediate wedge on the rotor rim, which has a cross section in the radial direction.

14. Synchronous generator, comprising a rotor, which rotates around a machine axis and is concentrically surrounded by a stator with a stator winding, whereby a plurality of permanent magnets and pole pieces are alternatingly arranged at a rim of the rotor, with the permanent magnets having north-south poles that are oriented in an essentially tangential direction, the pole pieces and pairs of permanent magnets alternate, the permanent magnets each have a rectangular cross section in an axial direction, the pole pieces each have a cross section in a radial direction with a symmetry plane of the trapezoid extending radially through the machine axis and the longer parallel side lying outside, and the two permanent magnets of each pair of permanent magnets are separated from each other by an intermediate wedge on the rotor rim, which has a cross section that corresponds to the trapezoidal pole pieces.

* * * * *